July 10, 1956 W. E. HAHN ET AL 2,753,768
METHOD AND APPARATUS FOR APPLICATION OF VALVE
SLEEVES DURING TUBING OPERATION
Filed May 12, 1953 9 Sheets-Sheet 2
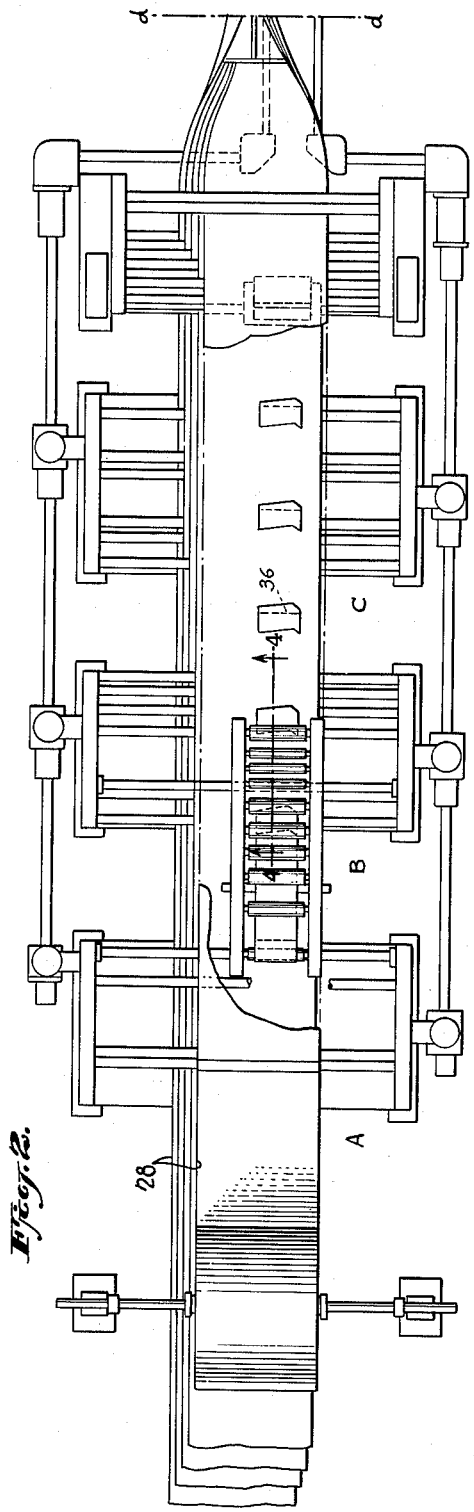
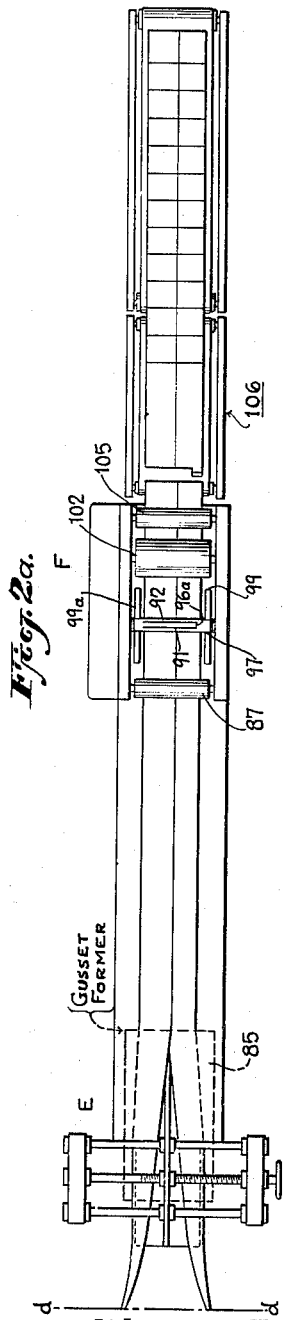
INVENTORS.
WILLARD E. HAHN.
EDWIN E. BURROUGHS.
BY Ward, Crosby & Neal
their ATTORNEYS.

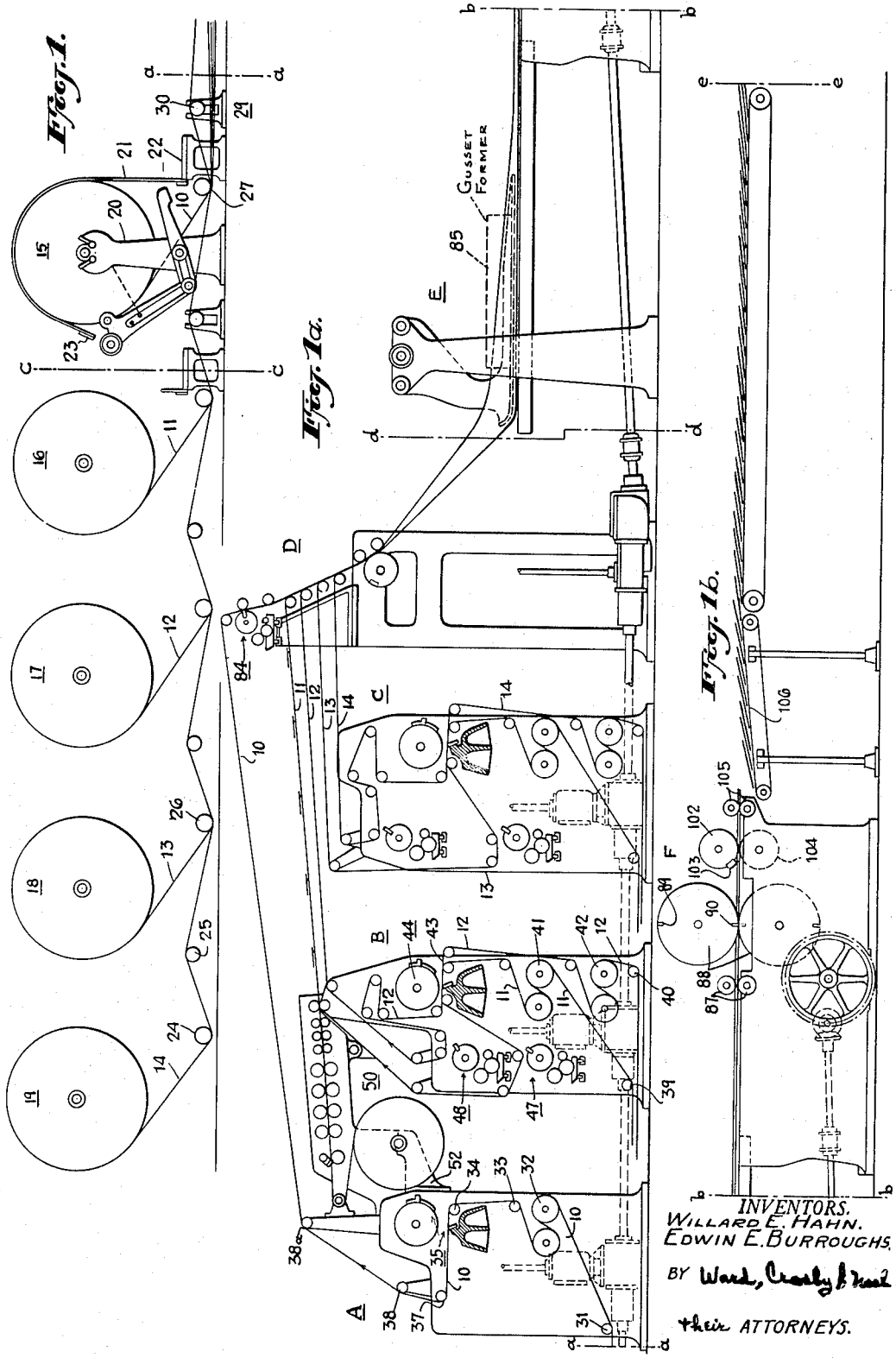

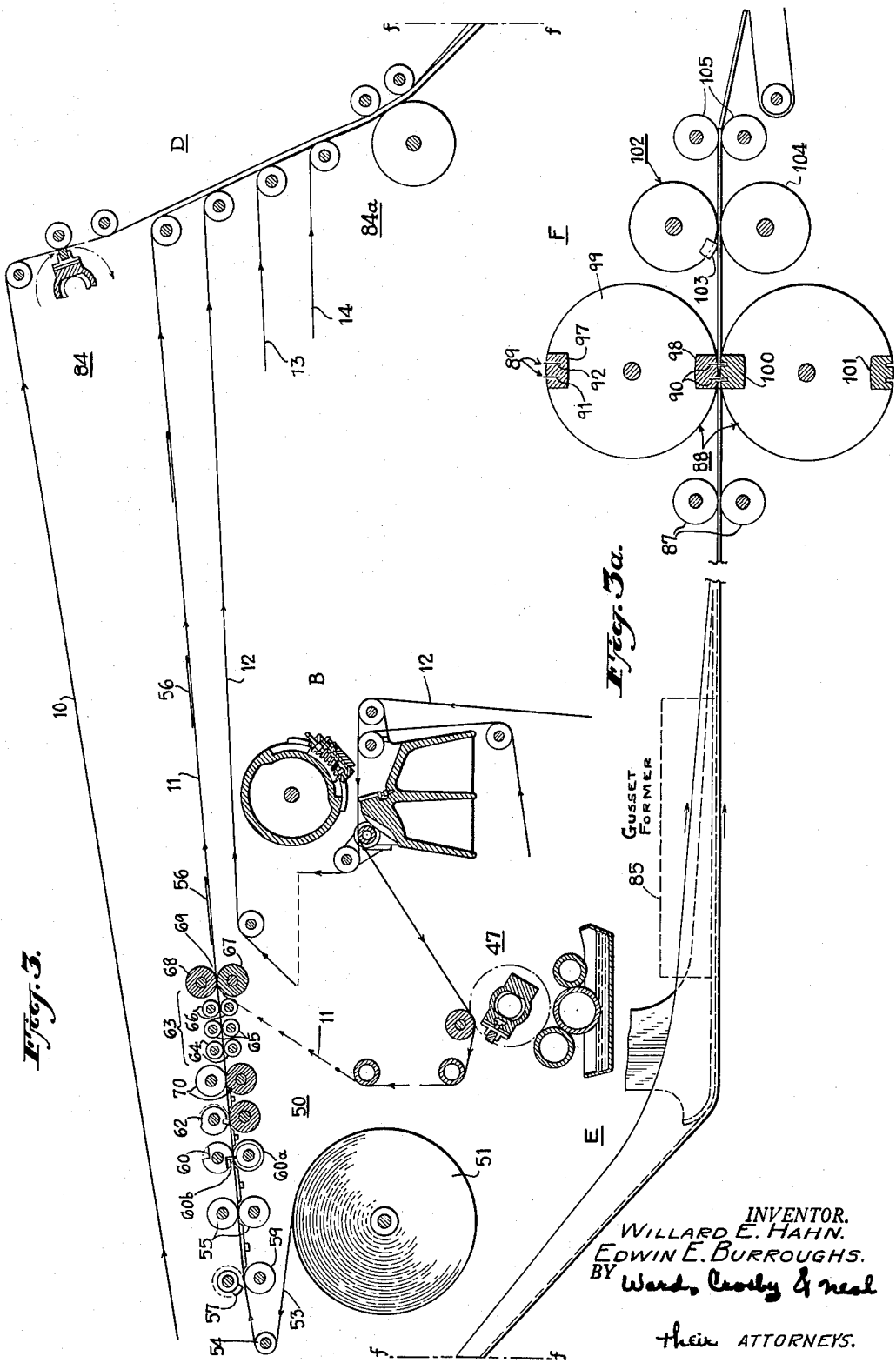

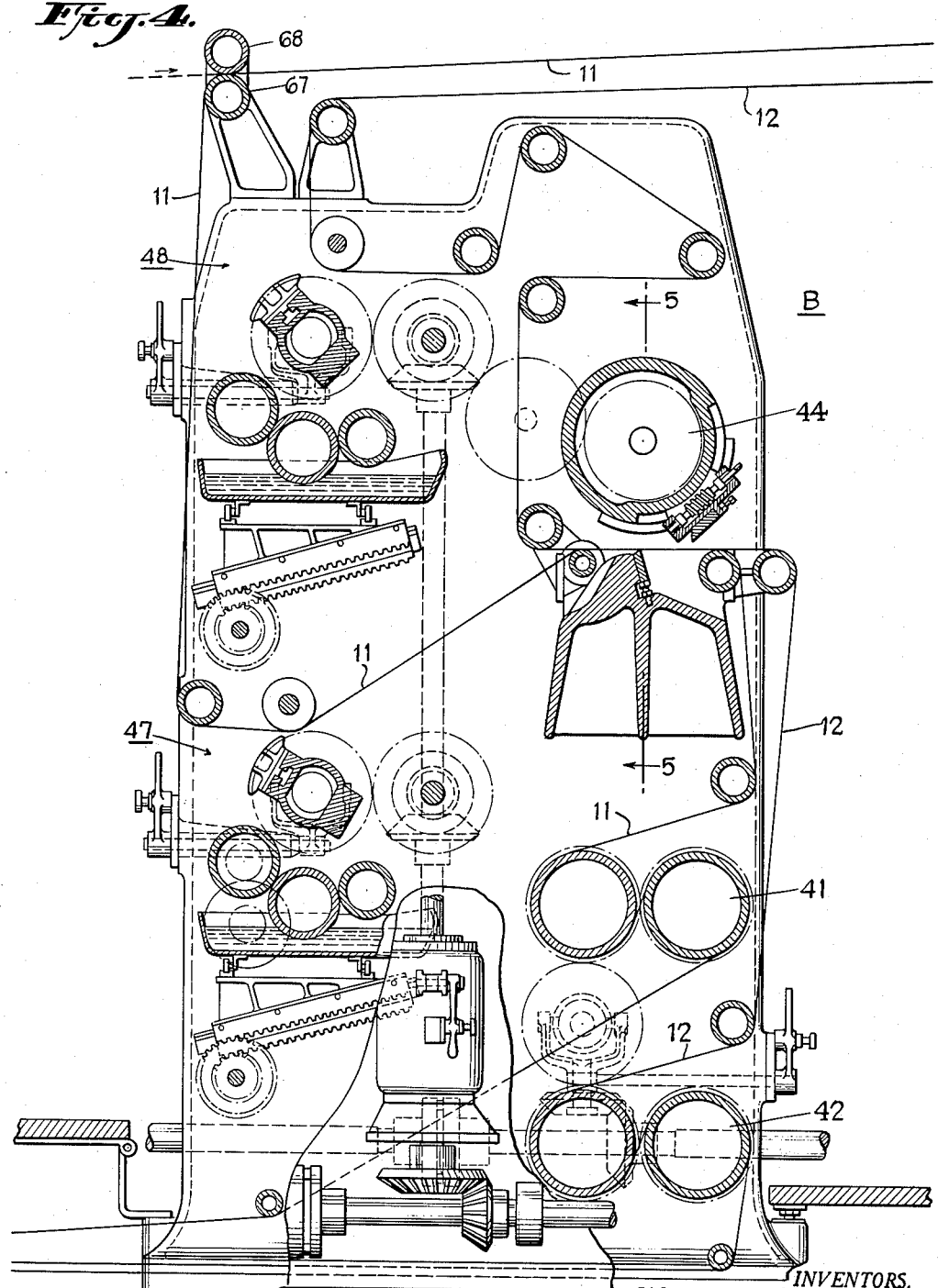

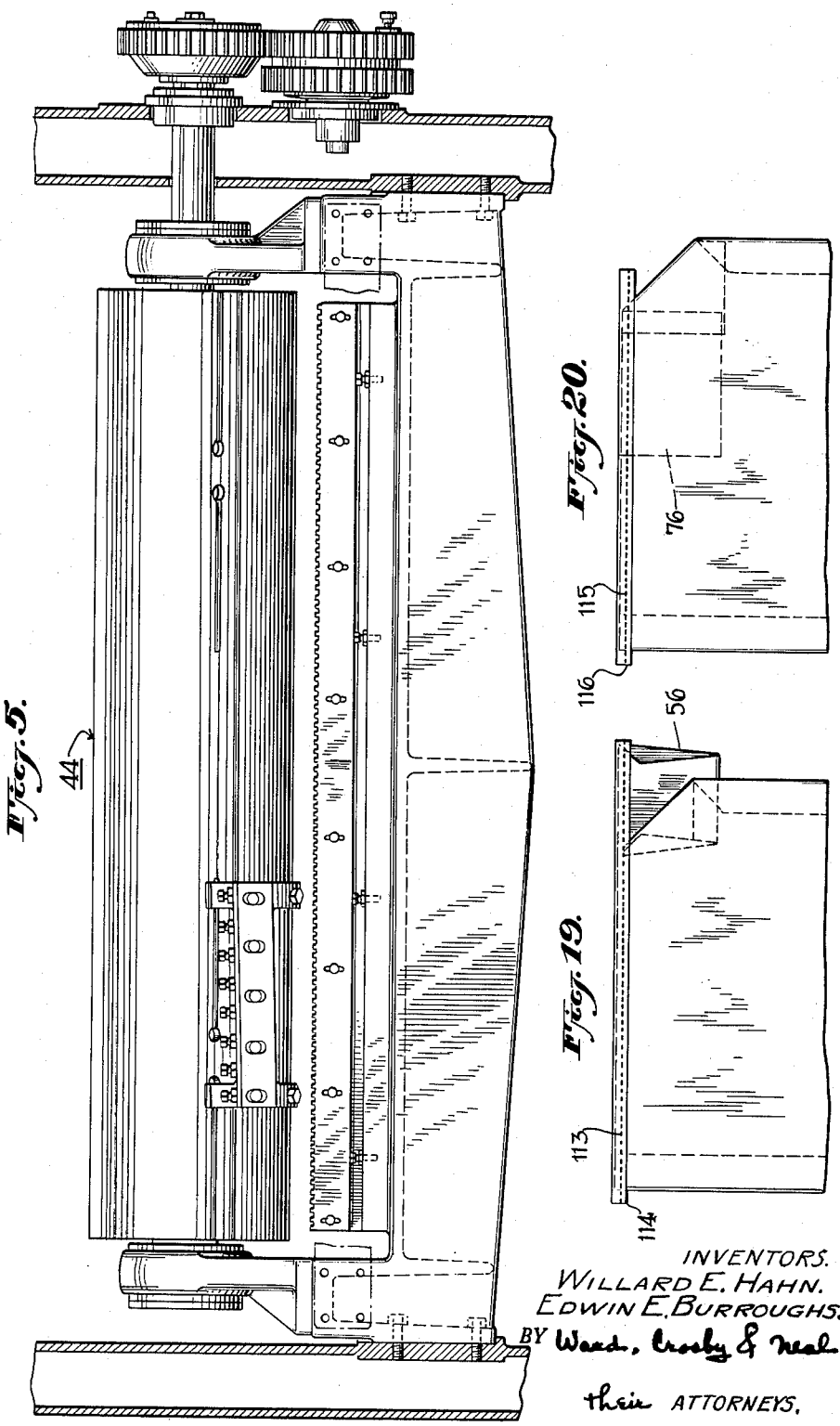

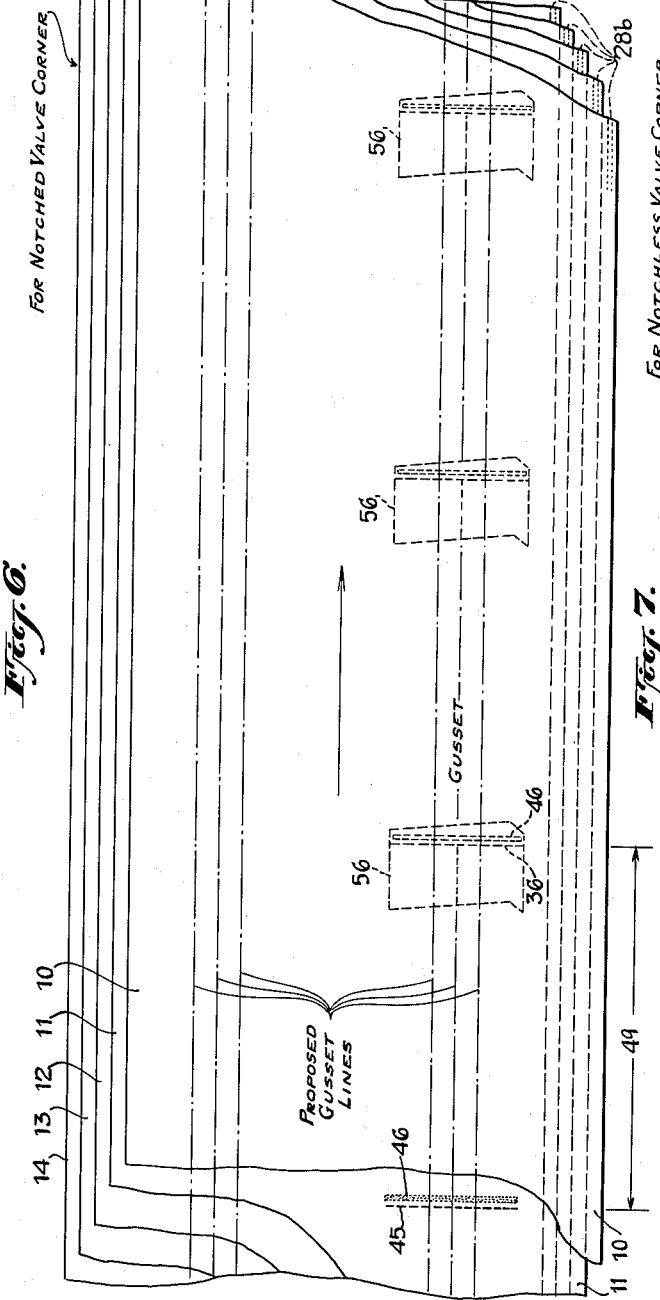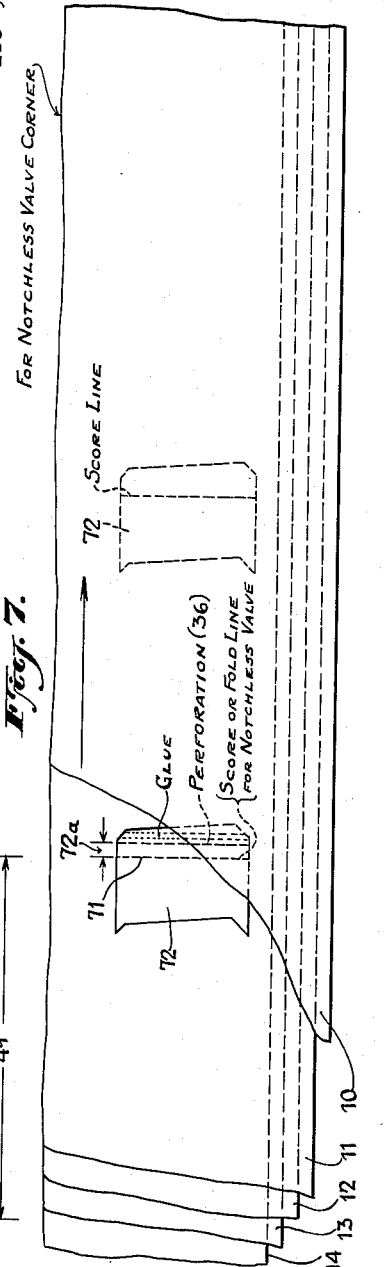

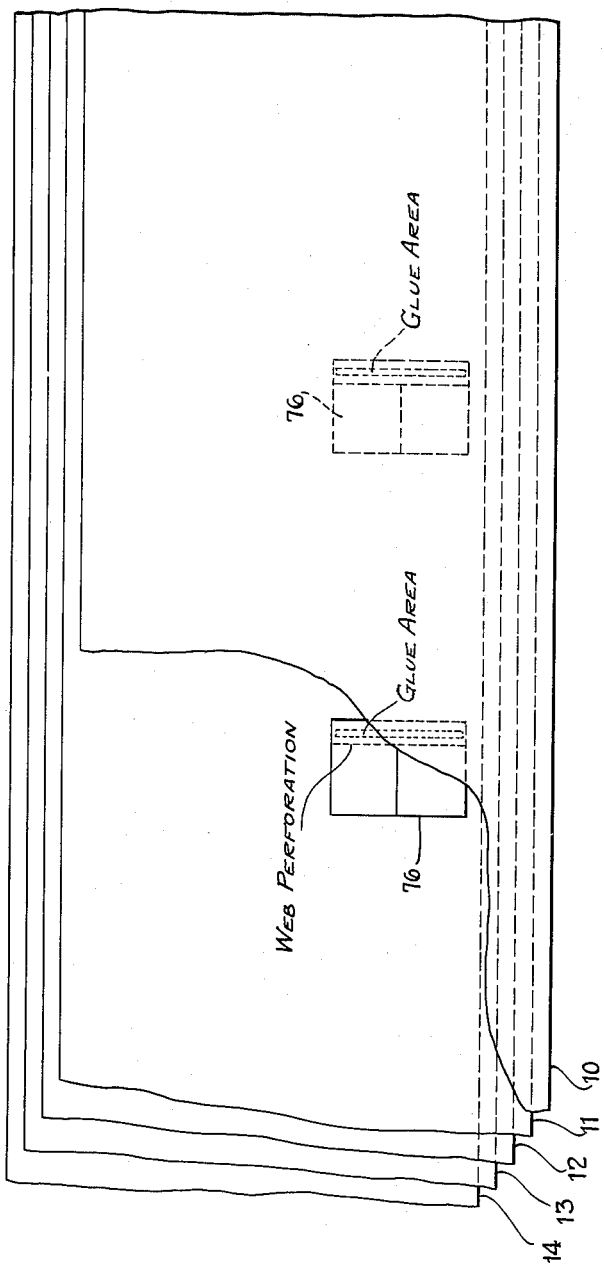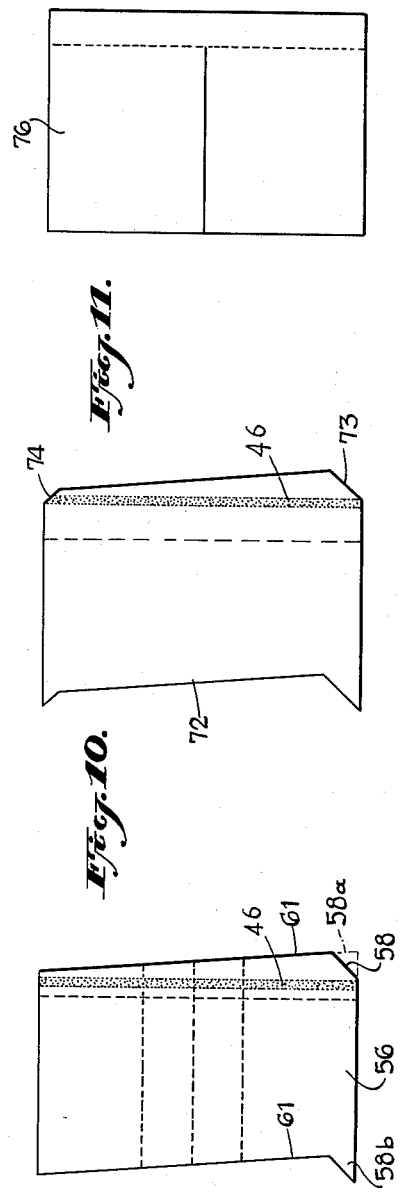

July 10, 1956 W. E. HAHN ET AL 2,753,768
METHOD AND APPARATUS FOR APPLICATION OF VALVE
SLEEVES DURING TUBING OPERATION
Filed May 12, 1953 9 Sheets-Sheet 8

INVENTORS.
WILLARD E. HAHN.
EDWIN E. BURROUGHS.
BY Ward, Crosby & Neal
their ATTORNEYS.

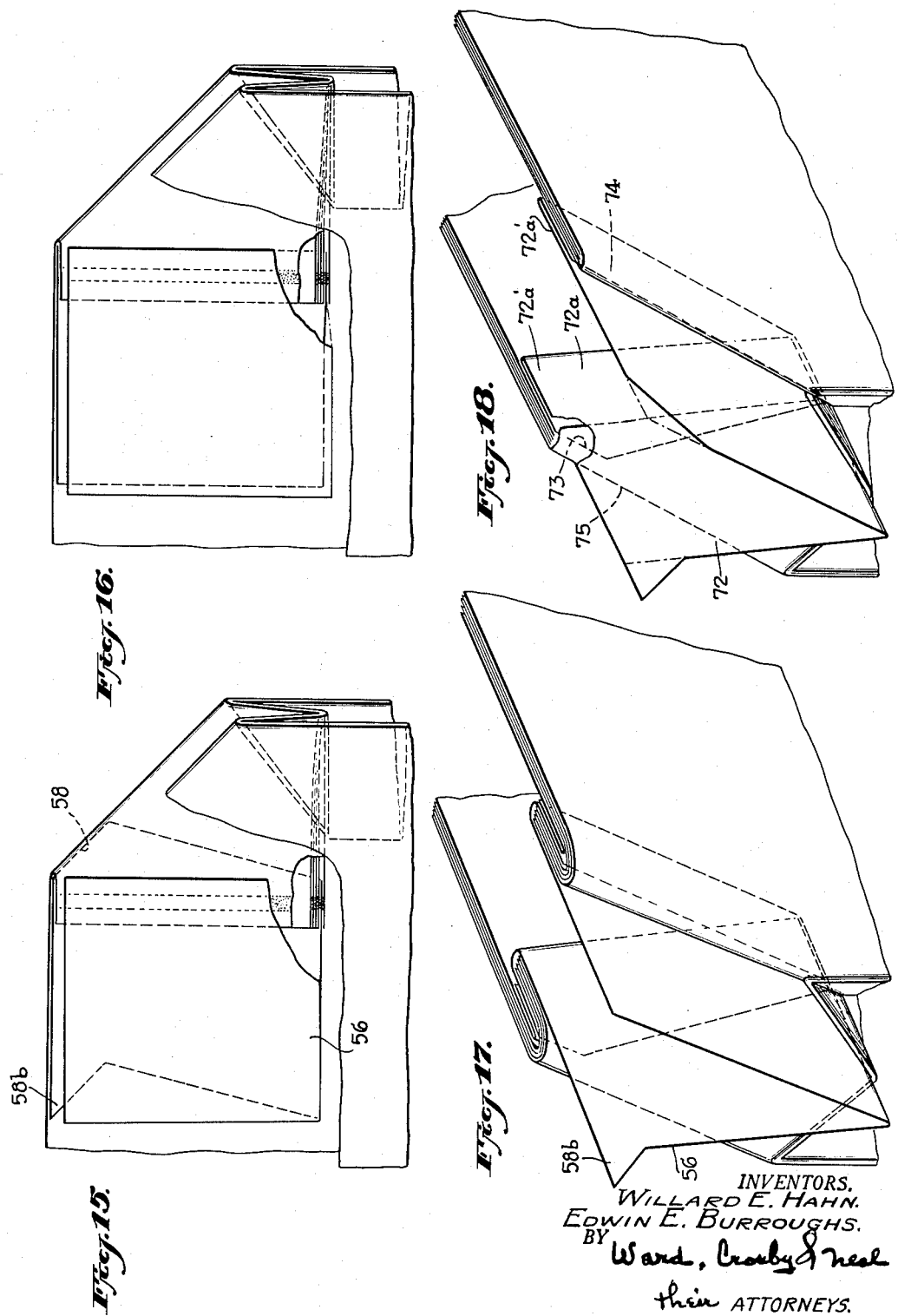

United States Patent Office 2,753,768
Patented July 10, 1956

2,753,768

METHOD AND APPARATUS FOR APPLICATION OF VALVE SLEEVES DURING TUBING OPERATION

Willard E. Hahn and Edwin E. Burroughs, Pensacola, Fla., assignors to St. Regis Paper Company, New York, N. Y., a corporation of New York Application May 12, 1953, Serial No. 354,578

26 Claims. (Cl. 93—8)

This invention relates to apparatus for manufacturing multi-wall valve bags from webs of paper or other thin sheet material, and more particularly relates to apparatus for interposing supplementary sheets, to form valve sleeves, between such webs during the tubing operation. Such valve sleeves are adapted to form closure sleeves or valve extension closure flaps for the valves of the finished bags. The machine of the invention is adapted for association with bag valver apparatus for forming the bag tube corners, with such supplemental sheets attached thereto, into sleeved bag valve corners, whereupon sewing apparatus can form a sewn seam across the ends of such tubes.

Heretofore, generally it has been the practice first to form a multi-ply tube, then to sever or separate the bag tube blanks therefrom at bag length intervals, whereupon the valve parts thereof are shaped by the use of suitable devices or machines. Thereafter the supplemental sheet to form the sleeve or valve flap extension has been inserted manually or by automatic machinery.

So far as is known, no practical or suitable machinery for interposing supplemental sheets during the multi-web tubing operation, and before all of the webs have been brought together, has been suggested or gone into use.

The invention will be described with reference to a machine constructed and adjusted to manufacture bag tubes having such supplemental sheets interposed between certain of the plies thereof at their valve corners, which tubes can be valved in any well known valving machine. A tubing apparatus, such as that shown in U. S. Patent No. 2,581,801, can be employed preferably but not necessarily the modification thereof for making bag tubes which do not have stepped ends, the bag tube cutoff unit thereof being modified as described below. Since U. S. Patent 2,581,801 relates to apparatus for the formation of a non-gusseted bag tube, this invention embraces the application of supplemental sheets to such type of bag tube although the invention, illustratively, is here described in connection with a gusseted type of bag tube. Furthermore, since such U. S. patent discloses the making of bag tubes having stepped ends, the present invention also embraces the application of supplemental sheets in the making of bag tubes with stepped ends adapted to be formed into stepped-end bags although, as aforementioned, the invention also embraces the application of supplemental sheets in the making of bag tubes, the ends of which can be sewn or otherwise closed by stitch-like means to form bags of the sewn end type.

The problem of constructing an automatic machine for forming multi-wall bag tubes having the supplemental sheets interposed between certain of the plies thereof presents a number of complications and difficulties. Since the supplemental sheets are interposed at bag length intervals between a preselected pair of the webs upon the tubing machine, the usual practice cannot be followed for cutting off the formed multi-ply tube at such bag length intervals by a simple rotating cutting knife.

Furthermore, in apparatus heretofore suggested for the application of supplemental sheets to valve bag tubes, none have been capable of applying such sheets at a speed equal to the speed of the bag tube forming machine.

Also in all devices heretofore suggested for applying supplemental sheets to bag tubes, such application has occurred after the bag tubes have been severed from the tubing machine and the accurate positioning of such supplemental sheets in the valve corners of such bag tube blanks has been made accurately only by means of devices of elaborate and complicated nature of substantial expense to manufacture.

In accordance with the present invention, apparatus is provided which overcomes the above difficulties and performs the function of applying a supplemental sheet to or between a preselected pair of webs during the tubing operation and prior to the bringing together of such preselected pair of webs into face to face contact, such supplemental sheets being so interposed between the webs at bag length intervals and in accurate position for valving.

The expressions "transverse partition line" or "transverse weakening line," as employed herein, embrace both perforation lines and cuts or cut lines.

In one aspect of the present invention, the various paper webs forming the bag plies are fed from rolls thereof, either singly or in superimposed groups, through perforator units individual to such single webs or superimposed web groups, wherein said webs or groups are transversely perforated part of the way across and along lines which are to form the inner end edges of the valve flaps in the finished bags. A web perforation as used herein refers to alternate short cuts separated by uncut portions. In lieu of such perforator units, any suitable means for forming transverse partition lines can be employed. Thereafter glue is applied at bag length intervals to the valve areas on at least one of the two webs between which the supplemental sheets are held. Transverse glue patterns also may be applied between other pairs of the webs between which no supplemental sheet is interposed whereby such webs at the valve areas may be adhered together. Before the two webs which are to hold the supplemental sheets come together, such supplemental sheets are fed in between them at proper intervals and at the proper places relative to the glue patterns ultimately to form valve flap extension or valve sleeves. The supplemental sheet forming unit thus may feed a narrow strip of sleeve forming material longitudinally in the direction of motion of one of the webs upon which such sheet is to rest, such supplemental sheet forming unit severing such strip at sleeve lengths, and for certain types of sleeves scoring same, as will appear hereinafter, and thereafter depositing the severed lengths upon one of the webs of the tubing machine. The webs are then fed from the aforementioned perforator units in spaced apart relation over a series of guide rolls which are individual thereto, and thence over an adjustable assembly roll unit at which the webs are assembled in proper superposed relation, the positions of and spacing between the latter rolls being adjustable, individually or in pairs or groups, for adjusting the spacings longitudinally of the webs between the lines of perforations in the successive webs, the webs being fed over these assembly rolls in laterally staggered or stepped relation, thereby to produce in the finished multi-wall bag tube, a longitudinal seam formed by the successive plies. After passing over such adjustable assembly rolls the webs, being so superimposed in laterally stepped relation, are fed thence past a glue applicator unit which applies longitudinally extending glue lines along the laterally stepped edges. If desired, the glue lines may be interrupted by suitable means at each perforation line. The superposed webs, with the interposed supplemental sheets, are then fed through a tube forming unit preferably having associated therewith a gusset former whereby a gusseted bag tube is produced. The tube forming unit produces a continuous gusseted tube, each ply of which is glued to itself along the longitudinal seams formed by the stepped lateral edges. Furthermore, at the valve region, if desired in addition to the two sleeve holding webs being glued to the sleeves, and thus in effect adhered together, the other webs, at such valve regions, may be adhered together by the aforementioned application of glue in the same region. After such assembly of the superposed webs has passed through the tube and gusset forming unit, the portions of the webs not previously perforated across are cut across by a suitable tube cutting unit and the bag lengths finally separated from each other, the bag tube of bag length last severed being separated from the bag tube proper at somewhat faster speed than the movement of such bag tube proper in order to insure that the valve areas thereof with the extended valve flap or sleeve are moved clear, and out of the way of the next oncoming bag tube length. The aforementioned cutting across of the web transversely across the portion not previously perforated, can be either by a single cut which transversely is in alignment with the previously formed partial perforations whereby a notchless type of valve corner is formed, or cuts may be made which chop out an oblong transverse portion of the web, one of the long sides of such chopped out portion being in alignment with the aforementioned partial perforation whereby a notched type of valve corner is formed. In lieu of the above partial perforating and cutting, the webs can be transversely perforated all the way across at the first-mentioned perforator units and later the tube lengths in succession can be pulled away from the bag tube proper by conventional means. The aforementioned operations thus will produce a multi-wall bag tube of the usual form except that a supplemental sheet will be extending outwardly therefrom at the valve corner in proper position for the forming of a valve. Such supplementary sheet can be of the tuck-in type or of the type to form an inwardly protruding valve flap extension sheet. Such bag blanks each having a supplemental sheet extending therefrom can then be valved in the usual way and the bag tube ends sewn, thereby to provide sewn valve bags. If the aforementioned supplemental sheet is to form a tuck-in type sleeve, preferably it should be of a relatively firm paper and of a proper shape and length to adapt same to the formation of such a tuck-in type sleeve. Preferably but not necessarily each such tuck-in type sleeve is initially heavily scored along the line where it is to be folded over to form a tuck-in sleeve. Thus after the valving operation has taken place, such tuck-in type of sleeve can be manually folded outwardly or suitable mechanical means as of an automatic nature can be employed in the valver to fold same outwardly at the time of valving. As aforementioned in connection with the tuck-in type of sleeve, the bag tube cutoff unit can be so constructed and arranged to form a notchless type of valve corner, that is, where the notch at the valve corner is eliminated by means of a single transverse cut across the bag tube in alignment with the previously made partial perforation at the valve area. Such eliminated notch can be replaced by having the folded over portion of the tuck-in sleeve extend far enough into the bag to take the place of the notch, that is, so that the folded over tuck-in sleeve will provide a double layer forming the inner end edge of the valve flap, which double layer is within the area of the sewn seam and also is securely pasted when installed between two of the webs. In the latter variation or modification, the supplemental sheet forming device is adjusted to produce a supplemental sheet which is somewhat wider than the supplemental sheet normally manufactured thereby, the increase in width being substantially equal to the width of the eliminated notch portion.

Various other objects, features and advantages of the invention will clearly appear from the detailed description given below taken in connection with the accompanying drawings which form a part of the specification and illustrate, by way of example, one form of apparatus which may be used in carrying out the invention. The invention resides in such novel features, arrangements and combinations of parts and method steps as may be shown and described in connection with the apparatus herein disclosed.

In the drawings:

Figs. 1, 1a and 1b comprise a view in side elevation and partly in longitudinal section, of a multi-wall bag tubing and supplemental sheet inserting machine in accordance with a preferred modification of the invention, Fig. 1a being a continuation of Fig. 1 as taken along line a—a of Fig. 1; while Fig. 1b is a continuation of Fig. 1a as taken along line b—b of Fig. 1a;

Fig. 2 is a plan view of the portion of Figs. 1 and 1a located between lines c—c and d—d thereof; while Fig. 2a is a plan view of the portion of Figs. 1a and 1b located between the lines d—d and e—e thereof;

Figs. 3 and 3a comprise a view in side elevation upon a slightly enlarged scale of portions of the apparatus shown in Figs. 1a and 1b, particularly the supplemental sheet forming and depositing unit, together with a single web perforating and glue applying unit, as in Fig. 3, Fig. 3a showing a tube and gusset forming unit, together with bag tube cutoff means, Fig. 3a being a continuation of Fig. 3 as taken along lines f—f of Fig. 3;

Fig. 4 is an enlarged vertical cross-section of one of the perforator and glue applicator units as taken substantially along line 4—4 of Fig. 2, this unit perforating transversely and partially the paper plies passing therethrough at bag lengths in the valve region only and applying transverse glue lines to certain of the plies also at the valve regions of such plies;

Fig. 5 is a vertical section of the perforator of Fig. 4 as taken substantially along lines 5—5 of such Fig. 4;

Figure 12:
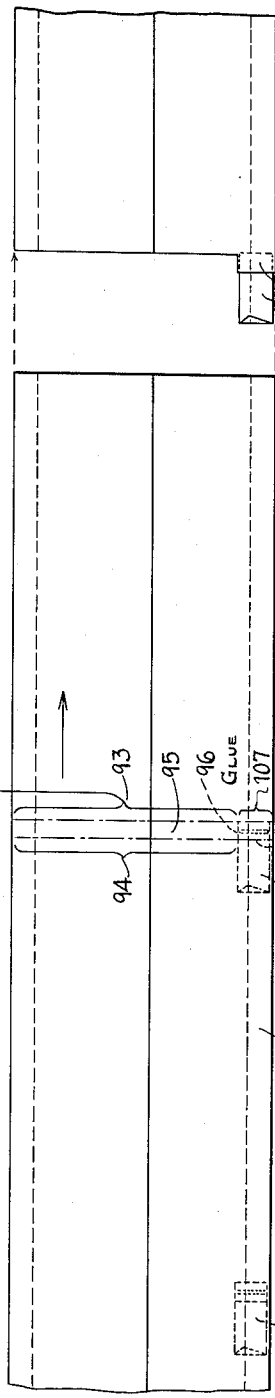
Figure 13:
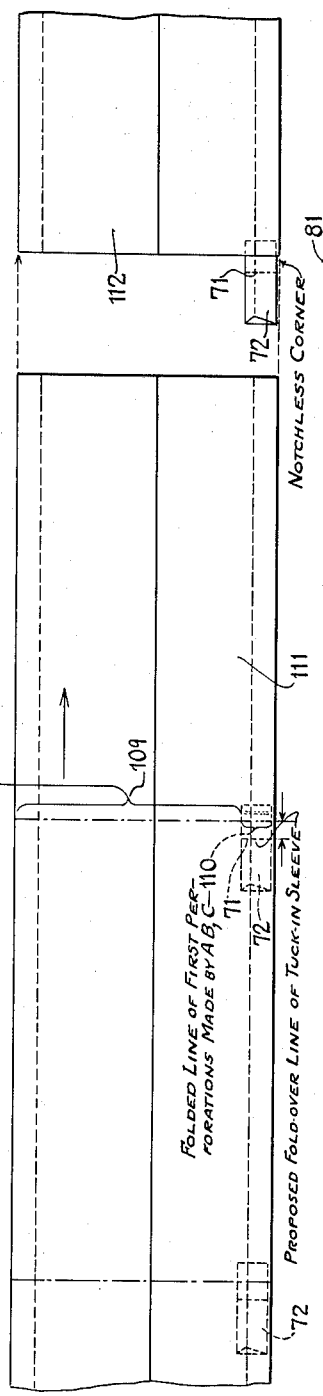
Figure 14:
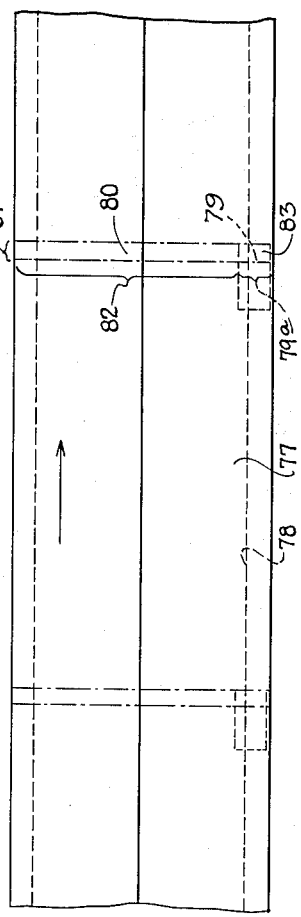

Fig. 6 comprises a plan view of a plurality of superposed webs (with portions thereof broken away) as brought together and superimposed by the aforementioned tubing machine and before said plies have been passed through the tube and gusset former unit, two of such superimposed plies having interposed therebetween at bag length intervals suitable supplemental sheets adapted for use with a notched type of valve corner;

Fig. 7 is a plan view of a plurality of superimposed webs, portions thereof being cut away for clarity, and also showing a plurality of supplemental sheets between two of such superimposed plies, the layout of Fig. 7 being substantially identical to that of Fig. 6 with the exception that the supplemental sheets of Fig. 7 are adapted for use with a notchless type of valve corner and are thus somewhat wider than the supplemental sheets shown in Fig. 6 by an amount substantially equal to the width of the eliminated notch portion, the supplemental sheets of Figs. 6 and 7 being, for example, of the tuck-in type;

Fig. 8 comprises a top view of superimposed webs substantially similar to that shown in Fig. 6 with the exception that between two of the superimposed webs are positioned a different type of supplemental sheet, namely, that adapted for forming an inwardly protruding valve flap extension sheet;

Figs. 9, 10 and 11 comprise plan views of several different types of supplemental sheets which may be employed in the present invention, the type of Figs. 9 and 10 being adapted for use as either inwardly protruding sleeves or outwardly protruding tuck-in types of sleeves and the supplemental sheet of Fig. 11 comprising a sheet adapted to form only an inwardly protruding valve flap extension sheet;

Fig. 12 is a top view of a gusseted bag tube formed by the apparatus of the present invention and having supplemental sheets positioned as aforementioned, such figure showing a transverse oblong portion which is cut from the bag tube and also showing a bag tube length which has been severed and separated from the bag tube proper; the bag tube lengths formed in accordance with Fig. 12 having the notched type of valve and a tuck-in type of sleeve;

Fig. 13 is a plan view of a gusseted bag tube formed in accordance with the present invention and similar to that shown in Fig. 12 with the exception that the bag tube is cut to form a notchless type of valve, Fig. 13 also showing a fully separated bag tube length;

Fig. 14 is a plan view of a gusseted bag tube formed by apparatus embodying the present invention and showing transverse cutting lines for forming a notched type of valve, there being interposed between two of the plies of such tube a supplemental sheet adapted especially for forming an inwardly protruding valve flap extension sheet of the type shown in Fig. 11;

Fig. 15 comprises a perspective view, partially in section and with parts broken away, of the valve corner of a sleeved and valved bag which has been valved after having been formed by the apparatus of Figs. 1, 1a and 1b, the valve corner being of the notched type and showing an inwardly extending tuck-in type sleeve;

Fig. 16 comprises a perspective view of a valve corner of a valve bag having a supplemental sheet therein, which sleeved and valved bag corner has been formed from a bag tube made in accordance with the present invention, there being shown a notched type of valve corner having an inwardly extending valve sheet;

Fig. 17 is a perspective view of the valve corner of a valve bag, the sleeved valve tube of which also has been made by apparatus embodying the present invention and showing an outwardly extending tuck-in type of sleeve, the valve corner being of the notched variety;

Fig. 18 is similar to Fig. 17 with the exception that the valve corner is of the notchless type, the notch having been eliminated and in effect replaced by an inwardly protruding double layer portion of the tuck-in type of sleeve;

Fig. 19 comprises a side view of a conventional bag which has had the sleeve inserted therein in accordance with the present invention, thereafter has been valved to form a conventional tuck-in type of sleeve, and thereafter the bag tube end is sewn to form a finished bag, the valve corner being of the notched type; and Fig. 20 comprises a side view of a gusseted valve and sleeved bag in which the supplemental sheet also has been interposed between the plies of the bag by machinery embodying the present invention, said bag tube thereafter being valved whereby such supplemental sheet is formed into an inwardly protruding valve flap extension, the valve corner also being of the notched variety.

Referring to Figs. 1 to 2a, inclusive, and considering first the overall operation of the apparatus, the combined supplemental sheet inserting and valve tubing machine is illustrated as set up to manufacture a 5-ply bag tube, the various paper plies 10–14, inclusive, of which are fed respectively from paper rolls 15–19, inclusive, individually mounted on roll stands, as at 20, which includes conventional facilities as indicated for shifting a new roll of paper into place as the paper becomes exhausted from the previous roll. For maintaining appropriate back tension on the paper webs, a belt 21 of canvas or the like, having one end secured to a crosswalk 22 is looped over the roll and terminates at a weight 23. Each web, such as 14, in passing off the paper roll, such as 19, is fed under a guide roll, as at 24, and thence over a resiliently mounted guide roll, as at 25, from whence it is fed under the guide roll for the next web, as at 26, whereby the two webs are superimposed, this procedure continuing for the next successive webs until all five webs are superimposed in passing under the final guide roll 27, the rolls of paper being so positioned in the roll stands that the webs are fed in transversely stepped relation, as at 28 (Fig. 2), at which region 29 the uppermost web 10 is separated from the rest, passing over guide roll 30, the remaining webs 11–14, inclusive, passing under this roll.

The uppermost web 10 passes under a guide roll 31 in a perforating unit shown generally at A and thence respectively over and under a pair of driven pull rolls 32 and over appropriate additional guide rolls, as at 33 and 34, through a perforator 35, wherein it is perforated, as shown at 36 in Fig. 6. The web 10 then passes suitable guide rolls, as at 37, 38, 38a, from which the web is directed toward a web assembly roll unit to be described hereinafter.

The next pair of webs 11, 12 are directed to a perforating and glue printing unit, shown generally at B, respectively over guide rolls 39 and 40. Thence such webs 11, 12 respectively are directed over and under pull roll units 41 and 42 which are substantially similar to pull roll units 32 above described. Thence the webs 11, 12 are guided over appropriately disposed additional guide rolls into superimposed relationship at 43 from whence they are led past a perforator unit 44 in which said webs 11 and 12 are concurrently and identically perforated at bag length intervals along a line, as at 45 (Fig. 6). Lines 36 and 45, and the analogous perforations (not shown) for the webs 13 and 14, are made at the valve region and only part way across the web and at bag length intervals. Such analogous perforations (not shown) in webs 13 and 14 are positioned immediately beneath and in register with perforations 36 and 45. As aforementioned, such transverse perforations, in a modification of the invention, can be formed all the way across the webs, thereby making unnecessary any further transverse cutting.

The supplemental sheet holding webs or plies, in the form shown are 10 and 11, that is, these are the plies between which are directly interposed the supplemental sheets which are intended to form the valve extensions. In order to hold such series of supplemental sheets to the web 11 prior to the latter being brought together with the other web 10, glue lines, as at 46 (Fig. 6), are printed upon the web 11 at bag length intervals by means of a glue printing unit 47 (Fig. 1a). Such glue line 46 is positioned close to but spaced away from and in advance of the perforation 45. If desired, a further glue line printing unit 48 may be employed for web 12, such glue line being in register with 46 of Fig. 6. The aforementioned glue lines 46 upon web 11 and the analogous glue line upon the web 12 are applied in such a way that they are on top of the webs in their substantially horizontal position (Fig. 1a) when passing from the perforator unit B to the web roll assembly unit.

It will be understood that the dimension 49, as shown in Fig. 6, constitutes one bag length.

The lowermost webs 13 and 14 are directed to a third perforator and glue printing unit shown generally at C, which is identical to that shown at B and performs the same function of concurrently and identically perforating the webs 13 and 14 at bag length intervals and printing glue lines slightly in advance of such perforations in positions analogous to the glue line 46 of Fig. 6.

Each of the perforator and glue printing units B and C of Fig. 1a is closely similar to analogous units shown in Fig. 3 of U. S. Patent 2,581,801, granted June 8, 1952, with the exception that in the form herein shown, only a single cutter bar is employed which is of a length equal to, for example, the line 36 (and also 45) of Fig. 6. The perforator unit A of the present Fig. 1a is identical to the perforator unit B with the exception that it is adapted for handling only a single web. Furthermore, the perforator unit A preferably does not employ a glue printing unit.

The supplemental sheet forming unit will now be described, reference being particularly had to Figs. 1a, 3 and 3a. Such supplemental sheet forming unit is positioned to deposit upon one of the webs, as at 11, a series of separate supplemental sheets and at bag length intervals. In the form shown, such supplemental sheet forming unit is indicated generally at 50 and is interposed between the perforator units A and B (Fig. 1a). It is constituted by a supplemental sheet or sleeve supply roll 51 rotatably mounted upon suitable means, such as arms 52 (Fig. 1a) and from which a supplemental sheet strip or web 53 is drawn over a rear guide roll 54 by means of suitable power driven feed rollers 55 and directed generally in the same direction as the supplemental sheet bearing web 11 (Fig. 3).

The supplemental sheet forming unit 50 can be provided with suitable means for forming any suitable type of such sheet, for example, one of the types of supplemental sheets shown in Figs. 9 or 10 or 11 and can be substantially similar to the supplemental sheet forming unit shown and described in copending United States patent application Serial No. 118,545, of Edwin E. Burroughs.

In the form shown in Figs. 1a and 3, the supplemental sheet forming unit 50 is adapted for forming supplemental sheets, such as 56 (Fig. 9), and thus is provided with a rotating knife 57 which makes the cut 58 (Fig. 9) which is disposed at 45° to the longitudinal axis of the sheet web 53, thereby eliminating a small triangular portion 58a from the leading edge, and forming triangular portion 58b on the trailing edge. The knife 57, of course, is angularly disposed relative to such axis of the web 53 in such a way that for each rotation thereof the short 45° cut is made in the web and against a resilient roller preferably of rubber, as at 59 (Fig. 3).

The feed rollers 55 feed the strip 53 thence to the cut-off rollers 60, 60a which, by a suitable knife 60b, form the cut 61 across the remainder of the web, as shown in Fig. 9. If desired, the short knife 57 for effecting the cut 58 may be eliminated and the supplemental sheets can be cut across their entire width by means of the knife of the cutoff rollers in which event such knife would of necessity be lengthened to effect such full cut. In order to obtain a valve outer edge offset effect for a tuck-in valve sleeve whereby the outer edges thereof are slightly angularly offset relative to one another, the strip 53 is cut by the knife 60b transversely thereof along a line which is slightly offset relative to a line perpendicular to the longitudinal axis of the strip 53. As aforementioned, such slightly angular offset transverse cut can be of the length shown at 61 in Fig. 9 or if desired, it can extend fully across the strip 53 as aforementioned.

It is, of course, within the purview of the invention to use any other suitable type of sleeve forming unit capable of delivering a series of sheets to the webs.

Thereafter the now severed supplemental sheet is engaged by pinch and forwarding rollers 62 of well known construction which engage the sheet and urge same into engagement with a speed-up roller unit 63 which serves the purpose of bringing the sleeve up to the speed of the web 11 upon which it is to be deposited. The speed-up roller unit 63, in the form shown, includes three pairs of such rollers 64, 65 and 66 which acting in combination direct the severed supplemental sheet between rollers 67 and 68. At the region 69 between the rollers 67 and 68 the supplemental sheet bearing web 11 is brought together with the succession of supplemental sheets aforementioned. Preferably the roller 68 is a light pressure roller and is designed for guiding each supplemental sheet into proper position upon the web 11 and urging same downwardly upon its glue line, as at 46 (Fig. 6), such glue line having been applied by the glue printing unit 47 (Figs. 1a and 3) as above set forth.

If it is desired to form a notchless type of valve corner, as shown in Fig. 18, having a tuck-in type of sleeve extending outwardly therefrom, we have found it desirable to replace the notched portion, which has been eliminated, by having the folded over portion of the tuck-in sleeve extend far enough into the bag so as to take the place of the eliminated notch, that is, so that the folded tuck-in sleeve provides a double layer forming the inner end of the valve flap. Such double layer is within the path of a sewing machine which may be employed for sewing the top of a bag.

It is desirable to score transversely the supplemental sheet which is to form the tuck-in sleeve of Fig. 18, such scoring being along the line where it has to be folded over to form such tuck-in sleeve. Thus scoring rollers 70 (Fig. 3) may be employed in the supplemental sheet forming unit 50 for the purpose of such transverse scoring as along a line 71 (Fig. 7) of a supplemental sheet 72 shown in such figure and also shown in greater detail in Fig. 10. The supplemental sheet 72 may be identical to supplemental sheet 56 with the exception that it is wider by the amount 72a (Fig. 7), such additional width being substantially equal to the width of the notch which has been eliminated. This can be, for example, ⅞ of an inch up to 1-⅛ inches. Furthermore, the supplemental sheet 72, in addition to having a 45° cut 73 analogous to the cut 58 of Fig. 9, has at an opposite corner thereof at 45° cut 74 which is somewhat smaller or shorter than the cut 73, thereby further to adapt this type of supplemental sheet to a notchless type of valve corner, as shown in Fig. 18. In the latter figure it will be seen that the cut 73 is fitted along the underside and within the corner of one of the valve fold lines 75 whereas the smaller 45° cut 74 is positioned at an opposite side of the valve in an analogous location. Such cuts 73 and 74 facilitate the formation of such type of sleeved valved corner, as shown in Fig. 18, because they eliminate corners of the supplemental sheet which might become folded under during the valving operation, provide an undesired additional thickness of paper at such points and hinder the accurate positioning of the sheet. The additional short 45° cut 74 may be effected by a suitable rotating knife (not shown) analogous to knife 57 of Fig. 3.

Glue lines 46, which are printed on the webs, are shown in Figs. 9 and 10 in desired positions relative to the supplemental sheets 56 and 72.

If it is desired to form a supplemental sheet, as at 76 (Fig. 11), by means of a supplemental sheet forming unit, the latter can be provided with suitable longitudinal slitting knives and cutoff knives perpendicular to the longitudinal axis of the strip 53, as shown and described in connection with the aforementioned copending U. S. patent application Serial No. 118,545. It is not necessary to fold the supplemental sheet 76 over the valve flap inasmuch as the sheet 76 is designed for forming an inwardly protruding valve flap extension as heretofore mentioned.

A plurality of superimposed webs having interposed between two of the plies thereof the type of supplemental sheet 76 (Fig. 11) is shown in Fig. 8. The webs shown in Fig. 8 are adapted to be folded over and formed into a tube by the tubing unit to be explained more fully hereinafter and then formed into the tube shown at 77 of Fig. 14, such tube being gusseted, as at 78. The aligned and registered partial perforations (36 and 45 of Fig. 6) are shown in folded condition in Fig. 14 at 79 conforming to the gusset 78. Suitable knives, to be described more fully hereinafter, are provided for cutting out of the tube at bag length intervals a series of oblong portions 80 thereby to cut transversely across the tube the remainder of its width which has been heretofore unperforated. The oblong portion 80 has a width 81 and a length 82 and when cut away forms a so-called notch type of valve corner, the notch being shown at 83 and being of a width 81 and a length 79a.

Reverting again to Figs. 1a, 3 and 3a, after the supplemental sheets have been deposited upon the web 11 at bag length intervals and after all of the webs 10–14, inclusive, have been subjected to the perforator units A, B and C, such webs are directed toward the aforementioned web assembly roll unit indicated generally at D. This unit may be identical to the analogous unit shown and described in aforementioned U. S. Patent 2,581,801 with the exception that a glue applicator unit 84 is provided for the purpose of printing upon the underside of the web 10 at bag length intervals glue lines which are in register and alignment with the glue line or area 46 (Fig. 6) whereby each supplemental sheet is held between two webs, there being interposed between such sheet and each web an area of adhesive.

A further glue applicator 84a is provided for printing along the downwardly exposed stepped longitudinal edges 28a (Fig. 6) of the successive paper plies, glue lines as shown at 28b. Glue applicator unit 84a, if desired, may be similar to that shown and described in said U. S. Patent 2,581,801.

Thereafter the now superposed webs 10–14 which have been brought together in the web assembly roll unit D are now directed to a tube and gusset forming unit, illustrated generally at E, which also may be substantially similar to that shown and described in the aforementioned patent 2,581,801, with the exception that there is here employed a gusset-forming device 85 of well known construction.

Such tube and gusset forming unit E takes the staggered superposed plies of Fig. 6, folds them over, forms a gusset therein and thereby produces the tube, as shown in Fig. 12, the latter tube being indicated at 86 and being adapted for the formation of a valve having a notched type corner with a supplemental sheet protruding therefrom of the type for forming a tuck-in sleeve.

Thereafter the bag tube 86 is directed to a bag tube cutoff unit shown generally at F which, in the form shown in Fig. 3a, is designed for forming a so-called notched type of valve corner similar to that described above in connection with Fig. 14. The bag tube cutoff unit F thus is constituted by a pair of superposed feed rollers 87 for grasping the bag tube and pulling same through the tube and gusset forming unit E. If desired, a plurality of superposed feed rollers 87 may be employed and these may comprise the main pull rollers of the entire apparatus. However, we have found it desirable to employ also the several sets of pull rolls in the perforator units A, B, C, as at 32, 41 and 42. The tube 86, after passing through the feed rollers 87, is directed to a pair of superposed cutoff rollers shown generally at 88. The cutoff rollers 88 include two pairs of knives 89, 90 each of which can be urged transversely across the bag tube for the purpose of cutting across those portions of the web not previously perforated. The upper pair of knives 89 is positioned diametrically opposed to the lower pair 90, as instantaneously viewed in Fig. 3a. The distance circumferentially between a point midway between these two diametrically opposed pairs of knives is equal to a bag length. The pair of knives 89, for example, consist of individual knives 91, 92 which are respectively positioned for forming cuts 93 and 94 (Fig. 12) through the tube 86. In order to form the aforementioned notched type of valve corner, an oblong portion 95 must be cut out and, in order to complete the cut, a short longitudinally extending slit must be formed in the tube, as at 96, by a suitable longitudinally extending slitter or knife 96a (Fig. 2a) held by the upper of the cutoff rollers as between each pair of knives 89, 90.

We have found it desirable to mount the knives 89 and 90 in suitable transversely extending bars 97 and 98 which are rigidly secured to axially spaced discs, there being, for example, two such discs 99, 99a in the upper of the rollers (Figs. 2a, 3a). Cooperating and supplementarily grooved bars 100 and 101 may be analogously mounted in discs comprising the lower of the rollers 88, respectively for cooperation with the knives in the bars 98 and 97.

After the bag tube has been cut across, as shown in Fig. 12, means are provided for pulling the bag tube blank away from the remainder of the advancing bag tube, thereby to pull apart the perforation formed at the valve corner region. Thus suitable bag tube blank grasping means are employed which operate at a greater speed than the feed or pull rollers 87. Such means comprise bag tube blank pull-away means, shown generally at 102 and consists of a rotating pinch bar 103 which operates in a well known manner in cooperation with a lower backing roll 104 to grasp each bag tube after being cut across by the knives, and thus to sever the perforations made at the valve corner.

It will be noted above that the rectangular cut well illustrated in Fig. 12 by the lines 93, 94 and 96, whereby the oblong portion 95 is cut away, forms a notch type of valve corner. The trailing knife 92 which reaches the bag tube (last), extends transversely in alignment with the aftermost edge of the notched valve corner.

Thereafter a pair of superposed delivery rolls of conventional construction, shown generally at 105, grasp each bag tube blank and delivers same into a conveyor 106 which removes same to a desired location.

Reverting again to Figs. 3a and 12, the transversely extending knives 89 and 90, together with the longitudinally extending slitter for each of such pair, are capable of cutting out the transversely extending oblong piece 95 (Fig. 12) thereby to form a notched type of valve corner. The knife 92 which is positioned for effecting the cut 93 is positioned in alignment with a line 107, and the transversely extending knife 91a is positioned in alignment with a transversely extending perforation 108 which, in Fig. 12, represents the aligned and registered partial perforations formed part way across each of the gusseted superposed plies at bag length intervals and across the valve corner region.

When it is desired to form a notchless type of valve corner of the type shown in Fig. 13, one knife of each of the pairs 89 and 90 is removed and the remaining knife of each pair, together with the cutoff mechanism, is adjusted for forming at bag length intervals a transverse cut, as at 109 (Fig. 13), which transverse cut is in alignment with a perforation line 110 which is analogous to the perforation line 108 of Fig. 12. That is, the line 110 represents the aligned perforations at the valve corner made by the perforator units A, B and C, such perforations being in alignment and being folded to conform with the gusset made by the aforementioned gusset former 85. Such perforations are shown, by way of example, in the aforedescribed Fig. 6 at 36 and 45, it being understood, of course, that each ply is suitably perforated to be pulled apart by the pull away means 102 of Fig. 3a.

Referring now to Figs. 7, 13 and 18, the supplemental sheets 72 are positioned, as in Fig. 7. The various plies are passed through the apparatus above described up to the tube and gusset forming unit E, thereby to produce the bag tube 111 shown in Fig. 13, from which the notchless type of valve corner is formed by means of a single knife, as 92, at each cut. Thereafter each separated bag tube blank, one of which is shown at 112 at the righthand extremity of Fig. 13, can be valved and the supplemental sheet folded over, thereby to extend outwardly from the bag valve, as shown in Fig. 18, whereby the now eliminated notch at the valve corner is replaced by the supplemental sheet portion 72a (Fig. 18), the folded over supplemental sheet now (Fig. 18) being in the form of a tuck-in type of sleeve which provides a double layer forming the inner end edge of the valve flap. As is well shown in Fig. 18, the upper portions of such inner end edge, as shown at 72a', is within the region which is to be sewn to form the sewn top of the bag.

Referring now to Fig. 12, the notched type of valve corner formed there provides a bag tube blank which, when subjected to one type of valving operation, produces the valve and supplemental sheet, as shown in Fig. 15, wherein the tuck-in type of sleeve extends inwardly from the notched valve corner. Such tuck-in type of sleeve 56 may be folded outwardly by manual means or by suitable automatic machinery. The position of the short 45° cut 58 is well shown in Fig. 15 positioned within the folds of the valve, such cut producing the triangular portion 58b which is integral with the opposite corner of the sleeve.

Referring now to Figs. 8, 14 and 16, the superposed webs of Fig. 8 having interposed between two plies thereof (10, 11) a supplemental sheet adapted for extending inwardly of the valve corner, are formed into the bag tube shown in Fig. 14 from which the oblong portion 80 is cut away by means of the bag tube cutoff unit F. From the bag tubes thus formed a valved bag corner may be formed, as is well shown in Fig. 16, wherein the sleeve extends inwardly at the notched type of this valve corner.

Referring now to Figs. 6, 12 and 17, the plies are superposed by the apparatus described above to form the aforedescribed tube 86 from which the notched type of valve corners are formed, the oblong portion 95 being cut away from each bag tube blank. Such notched bag tube blank may have formed at the valve corner thereof the sleeved valve, as shown in Fig. 17, the supplemental sheet having been folded over along the inner end edge of the valve flap of the bag, thereby to form an outwardly extending tuck-in type of sleeve.

The bag tube of Fig. 17 can be formed into a finished bag by sewing same across the top thereof, as shown at 113 of Fig. 19, a suitable closure tape 114 preferably being employed.

Also the bag tube blank, the sleeved valve corner of which is shown in Fig. 16 may be completed by sewing the same across a line 115, as indicated in Fig. 20, there preferably being here employed also a closure tape 116.

It is, of course, understood that all of the parts of the above described apparatus are operated in timed relationship by any suitable means.

It is within the purview of the invention to apply supplemental sheets to a web supply during tubing operation, such supply consisting of one or more webs. For example, supplemental sheets may be applied, in accordance with the present invention, to a web supply consisting of one web. Although the succession of supplemental sheets in the invention above described are applied between a preselected pair of webs (10, 11), it is, of course, possible to apply same between any other pair of webs or to the outer surface of one of the outer webs, such as 10 or 14 (Fig. 1a). Where all of the webs are adhered together at a valve corner region, the need to have a supplemental sheet cuff folded over the inner end edges of the valve flap is diminished and consequently such supplemental sheet can be adhered between any pair of plies or might be adhered solely to the outer surface of the outer bag ply but, of course, within the valve corner. Also any common type of tuber can be employed in the present invention.

While the invention has been described with respect to a preferred example, it will be understood by those skilled in the art, after understanding the invention, that various changes and modifications may be made without departing from the spirit and scope of the invention, and it is intended, therefore, in the appended claims to cover all such changes and modifications.

What is claimed is:

1. In apparatus for forming valve bag tubes having a folded supplemental sheet applied to one corner thereof comprising a valvable sleeved corner, the combination comprising: a tubing machine for forming a tube from a web supply, and having a tube former including web folding means, and pull rolls for drawing the web supply through the machine; means for forming weakening lines in said web supply, as it is drawn through the machine, over a portion of the width thereof and at bag length intervals, the weakening lines so formed being positioned at regions which are to form valve corners such means for forming weakening lines being located ahead of said tube former; means for applying to such web supply as it passes through such machine a series of supplemental sheets at bag length intervals and also in such regions which are to become the valve corners, each sheet spanning a respective weakening line in such web supply whereby said sheets are also positioned for being folded over by said web folder to form the sleeved corner; means positioned following said tube former for cutting across the formed tube over that portion of the width thereof remaining unweakened by said weakening line forming means and without cutting such supplemental sheets; and means for separating each tube from the preceding tube portion after such cuttings.

2. In apparatus of the class described, a multiply paper bag tubing machine having a plurality of roll stands from which paper webs are supplied, and a tube-former followed by pull rolls for drawing the webs through the machine, such tube-former having a folder for folding such webs into a tube along opposed fold line regions, a plurality of perforator units each containing a perforator for perforating the web or webs passing therethrough transversely at bag length intervals across part of the width thereof, said perforator units being movable in timed relationship whereby such perforations are moved into register, said units being located between said stands and tube former and positioned for making such partial perforations transversely of one of said fold line regions and at areas which are to become valve bag corners, means for depositing on one of said webs after being perforated in such a unit, a succession of sleeve lengths at bag length intervals, such sleeve lengths spanning such transverse perforations, whereby such sleeve lengths also are foldable by such folder; means for making cuts partially across said tube at bag length intervals, such cuts extending from the terminal points of such perforations across the theretofore uncut portion of the tube to the edge thereof; and means for separating each bag tube blank from the preceding tube after such cut.

3. In apparatus for forming a succession of separate valve bag tubes each having a folded supplemental sheet applied to one corner thereof thereby comprising a valvable sleeved corner, the combination comprising: a multiply paper bag tubing machine having means for pulling a plurality of paper webs from a plurality of paper rolls and a folder for forming same into a tube, means for effecting substantially aligned transverse weakening lines across said webs at bag length intervals at regions which are to form valve corners, means for interposing a succession of supplemental sheets between two of said webs and between the weakening lines thereof and prior to such webs reaching said tube former whereby said sheets span their respective weakening lines and are folded over by said folder to form the valve sleeve; and means for separating the formed bag tube into bag lengths after the webs have passed said folder.

4. The method for forming a succession of valve bag tubes each having a folded supplemental sheet applied to one corner thereof comprising a valvable sleeved corner which consists in: superposing in face-to-face engaging relationship a plurality of webs of paper; perforating at bag length intervals each of said webs of paper prior to such superposing, said perforating being partially across the width of each web and at regions which are to form valve corners; also prior to such superposing of webs applying adhesively to a preselected web a succession of sleeve lengths, one spanning each such perforation and thus positioned at such regions which are to form such valve corners; folding said superposed partially perforated webs having the succession of sleeve lengths so applied, into a bag tube with the longitudinal edges of said webs overlapping one another, such folding also folding said supplemental sheets to form valve sleeves; cutting the now formed bag tube across the portion thereof not theretofore perforated; and separating each bag length from the preceding bag tube portion after such cut.

5. The method for forming valve bag tubes each having a folded supplemental sheet applied to a valve corner thereof to form a valvable sleeved corner which consists in: perforating each of a plurality of paper webs partly there across and at bag length intervals and along lines which are to form the inner end edges of a valve flap in a finished bag, applying a succession of supplemental sheets one at a time to one of said webs and at bag length intervals and each spanning its respective partial perforation whereby it will form a valve sleeve, thereafter superposing said webs, folding said superposed webs to form a bag tube along a fold line region bearing such partial perforations and said supplemental sheets, the latter being folded to form a valve sleeve, and thereafter cutting the formed tube at bag length intervals across the portions thereof theretofore unperforated, and thereafter separating such tube into bag tube lengths after each has been so cut across.

6. The method for forming sleeved valve bag tubes which consists in: forming a plurality of paper webs, perforating each paper web part way across and at bag length intervals and along lines which are to form the inner end edges of a valve flap in a finished bag, applying a succession of supplemental sheets one at a time to one of said webs and at bag length intervals and each positioned spanning its respective partial perforation whereby it will form a valve flap extension, thereafter superposing said webs with the supplemental sheets interposed therein, folding said superposed webs to form a bag tube along a fold line region bearing said perforations and said sheets, the latter being thereby also folded to form the valve flap extension, and thereafter separating the formed tube into bag lengths.

7. In apparatus for forming valve bag tubes each having a folded supplemental sheet extending from one corner thereof to form a valvable sleeved bag tube corner, a multi-ply paper bag tube forming machine having means for pulling a plurality of paper webs from a plurality of paper rolls, and for folding same along two opposite fold line regions thereby forming same into a tube; means situated in advance of said tube former for forming transverse weakening lines in said webs at bag lenth intervals transversely of one of said fold line regions and at least partially across the width of such webs; means situated between said weakening line forming means and tube former for applying adhesively a succession of such supplemental sheets to said webs over one of said fold line regions at bag length intervals, and spanning the weakening lines formed by such means; and means for separating the webs into bag tube lengths after passage through the tube former.

8. In apparatus for forming a succession of separate valve bag tubes each having a folded supplemental sheet applied to one corner thereof thereby comprising a valvable sleeved corner, a tube former having a folder for folding a web into a tube; pull roll means for drawing the web through the tube former; means, located ahead of said tuber former, for forming transverse lines of partition in the web at bag length intervals across at least a part of the width of the web as it is drawn through the apparatus, such lines being positioned at regions which are to form valve corneres of the tube lengths, and at which regions the web is folded over by such folder; means, also located ahead of said tube former, for applying to the web as it is drawn through the apparatus a series of such supplemental sheets at bag length intervals and in such valve corner regions whereby each of said sheets spans its respective line of partition and also is positioned for being folded over by a folder to form the valve sleeve; and means for separating the web into bag lengths after the web has passed through such tube former.

9. In apparatus of the class described, the combination with a bag tuber for forming a succession of flattened bag tubes from a web, such tuber having means for folding and creasing the web along two opposite fold line regions thereby forming same into a flattened tube; means situated in advance of such tube former for forming weakened lines in a fold line region transversely of said web at bag length intervals and at least partially across the width of such web; means situated between said weakened line forming means and tube former for applying adhesively a succession of supplemental sheets to said web spanning such weakened lines whereby such sheets are placed in the path of such means for folding and creasing which means can simultaneously form aligned and contiguous creases in both such web and sheets; and means for separating the webs into bag tube lengths after passage through the tube former.

10. In apparatus for forming a succession of flattened valve bag tube blanks each having a folded supplemental sheet protruding from one corner thereof to form a valvable sleeved bag tube corner, a paper bag tube forming machine having means for pulling a paper web therethrough, and means for folding same along two opposite fold line regions thereby forming same into a flattened tube having longitudinally extending folds along the opposite sides thereof; means situated in advance of such tube former for forming weakened lines at bag length intervals transversely of at least one of said fold line regions and at least partially across the width of such web; means situated between said weakened line forming means and said tube former for applying adhesively a succession of such supplemental sheets to said web, each such sheet spanning its respective weakened line and thereby being positioned in the path of such folding means whereby such means simultaneously can form aligned and contiguous folds in both such web and sheets; and means for separating the webs into bag tube length after passage through the tube former.

11. Method for forming multi-ply valve bags which comprises: advancing toward assembled superposed relationship a plurality of paper webs which are to form the bag tubes, while interposing and adhering between two of the webs at bag length intervals supplemental sheets which are each shaped and positioned ultimately to form valve flap extensions; also, before the webs are brought together, weakening each of same along transverse lines which are to constitute the inner edges of the multi-ply valve flap in the finished bags; then, after the webs are brought into contact, continuously forming same into a multi-ply flattened tube with gussets along each side and with said supplemental sheets also folded along the gusset fold lines at one side; then separating the continuous tube at bag length intervals along transverse lines which are substantially in alignment with such weakened lines, and whereby one of said supplemental sheets remains protruding from the valve corner of each tube length and is folded in the form of a continuation of a gusset; thereafter folding in the valve corner of each tube length along diagonal lines to form an inwardly directed valve flap, with such sheet forming an inward extension of such flap; and finally closing the mouth of each bag tube with a sewn seam, the stitches of which pass through the two ends of said supplemental sheet.

12. Method for forming multi-ply valve bag tubes which comprises: advancing toward assembled superposed relationship a plurality of paper webs which are to form the tubes while interposing and adhering between two of the webs at bag length intervals supplemental sheets which are each shaped and positioned ultimately to form valve flap extensions; also, before the webs are brought together, weakening each of same along transverse lines which are to constitute the inner edges of the multi-ply valve flap in the finished bag tubes; then, after the webs are brought into contact, continuously forming same into a multi-ply flattened tube with gussets along each side and with said supplemental sheets also folded along the gusset fold lines at one side; then separating the continuous tube at bag length intervals along transverse lines which are substantially in alignment with such weakened lines, and whereby one of said supplemental sheets remains protruding from the valve corner of each tube length; and thereafter folding in the valve corner of each tube along diagonal lines to form an inwardly directed valve flap, with such sheet forming an inward extension of such flap.

13. In the manufacture of multi-ply bags with valve sleeves, the steps of forming transverse lines of partition in each of a plurality of continuous webs, the lines being spaced at bag length intervals along the length of the webs and aligned longitudinally of the webs, securing valve sleeves to one web with the sleeves spaced at intervals corresponding to the spacing of the lines and with each sleeve in a position wherein it is intersected by a line in said one web, each sleeve being secured to said one web on one side only of the respective line of partition, combining the webs with the lines in register and with the valve sleeves between the webs, forming the resultant multi-ply web with the sleeves between its plies into a flattened tube wherein the sleeves are located at one side of the tube and extend around the side of the tube from one wall thereof to the other with the side edges of each sleeve substantially coincident and the ends of the group of lines at each sleeve substantially coincident, and then segmenting the tube into individual bag lengths by a cutting operation involving cutting the tube on a transverse line extending from the coincident ends of each group of lines to the opposite side of the tube without cutting the sleeves.

14. In the manufacture of multi-ply bags with supplemental sheets comprising valve sleeves, the steps of forming transverse lines of partition in each of a plurality of continuous webs, the lines being spaced at bag length intervals along the length of the webs, securing supplemental sheets to at least one web with such sheets spaced at intervals corresponding to the spacing of such lines and with each such sheet in a position wherein it is intersected by such a line in a web, each such sheet being secured to a web on one side only of its respective line of partition, combining the webs, forming the resultant multi-ply web which such sheets so associated therewith into a flattened tube wherein the supplemental sheets are located at one side of the tube and extend around the side of the tube from one wall thereof to the other with the side edges of each such sheet substantially coincident, and then separating the tube into individual bag lengths.

15. In the manufacture of multi-ply bags with valve sleeves, the steps of forming transverse slits in each of a plurality of continuous webs, the slits being spaced at bag length intervals along the length of the webs and aligned longitudinally of the webs, securing valve sleeves to one web with the sleeves spaced at intervals corresponding to the spacing of the slits and with each sleeve in a position wherein it is intersected by a slit in said one web, each sleeve being secured to said one web on one side only of the respective slit, combining the webs with the slits in register and with the valve sleeves between the webs, forming the resultant multi-ply web with the sleeves between its plies into a flattened tube wherein the sleeves are located at one side of the tube and extend around the side of the tube from one wall thereof to the other with the side edges of each sleeve substantially coincident and the ends of the group of slits at each sleeve substantially coincident, and then segmenting the tube into individual bag lengths by a cutting operation involving cutting the tube on a transverse line extending from the coincident ends of each group of slits to the opposite side of the tube without cutting the sleeves.

16. In the manufacture of multi-ply bags with valve sleeves as set forth in claim 15, the securement of the valve sleeves being by pasting.

17. In the manufacture of multi-ply bags with valve sleeves as set forth in claim 15, said cutting operation further involving the cutting of the tube on a line extending longitudinally of the tube from the coincident ends of each group of slits in the direction toward the valve sleeve securement for a distance corresponding to the desired length for valve notches, and on a transverse line extending from the end of said longitudinal line to said opposite side of the tube.

18. In the manufacture of multi-ply bags with valve sleeves as set forth in claim 17, the securement of the valve sleeves being by pasting.

19. In the manufacture of multi-ply bags with valve sleeves, the steps of forming transverse slits in each of a plurality of continuous webs, the slits being spaced at bag length intervals along the length of the webs and aligned longitudinally of the webs, combining the webs with the slits in register and, as the webs are being combined, securing valve sleeves between the webs with the sleeves spaced at intervals corresponding to the spacing of the slits and with each sleeve in a position wherein it is intersected by a group of registering slits, each sleeve being secured between the webs on one side only of the respective group of slits, forming the resultant multi-ply web with the sleeves between its plies into a flattened tube wherein the sleeves are located at one side of the tube and extend around the side of the tube from one wall thereof to the other with the side edges of each sleeve substantially coincident and the ends of the group of slits at each sleeve substantially coincident, and then segmenting the tube into individual bag lengths by a cutting operation involving cutting the tube on a transverse line extending from the coincident ends of each group of slits to the opposite side of the tube without cutting the sleeves.

20. In the manufacture of multi-ply bags with valve sleeves as set forth in claim 19, the securement of the valve sleeves being by pasting.

21. In the manufacture of multi-ply bags with valve sleeves as set forth in claim 19, said cutting operation further involving the cutting of the tube on a line extending longitudinally of the tube from the coincident ends of each group of slits in the direction toward the valve sleeve securement for a distance corresponding to the desired length for valve notches, and on a transverse line extending from the end of said longitudinal line to said opposite side of the tube.

22. In the manufacture of multi-ply bags with valve sleeves as set forth in claim 21, the securement of the valve sleeves being by pasting.

23. In the manufacture of multi-ply bags with valve sleeves, the steps of passing a plurality of webs in superimposed relation through a cutter to form transverse slits in each web with the slits spaced at bag length intervals along the length of the webs and aligned longitudinally of the webs, separating the webs, securing valve sleeves between the webs with the sleeves spaced at intervals corresponding to the spacing of the slits and with each sleeve in a position wherein it is intersected by a slit, each sleeve being secured between the webs on one side only of the slit, combining the webs with the slits in register to form a multi-ply web with the sleeves between plies, forming the multi-ply web into a flattened tube wherein the sleeves are located at one side of the tube and extend around the side of the tube from one wall thereof to the other with the side edges of each sleeve substantially coincident and the ends of the group of slits at each sleeve substantially coincident, and then segmenting the tube into individual bag lengths by a cutting operation involving cutting the tube on a transverse line extending from the coincident ends of each group of slits to the opposite side of the tube without cutting the sleeves.

24. In the manufacture of multi-ply bags with valve sleeves as set forth in claim 23, the securement of the valve sleeves being by pasting.

25. In the manufacture of multi-ply bags with valve sleeves as set forth in claim 23, said cutting operation further involving the cutting of the tube on a line extending longitudinally of the tube from the coincident ends of each group of slits in the direction toward the valve sleeve securement for a distance corresponding to the desired length for valve notches, and on a transverse line extending from the end of said longitudinal line to said opposite side of the tube.

26. In the manufacture of multi-ply bags with valve sleeves as set forth in claim 25, the securement of the valve sleeves being by pasting.

References Cited in the file of this patent

UNITED STATES PATENTS

| | | |
|---|---|---|
| 2,260,064 | Stokes | Oct. 21, 1941 |
| 2,442,431 | Peters et al. | June 1, 1948 |
| 2,581,801 | Lienart | Jan. 8, 1952 |
| 2,586,514 | Canno | Feb. 19, 1952 |